United States Patent [19]

Fujita et al.

[11] 4,190,689

[45] Feb. 26, 1980

[54] POLYMERIC-SHAPED ARTICLE

[75] Inventors: Saburo Fujita, Otsu; Masahiko Motegi, Hikone; Satoru Okamoto, Otsu; Atsuhiko Soda, Otsu; Masakazu Inoue, Otsu, all of Japan

[73] Assignee: Toray Industries, Inc., Tokyo, Japan

[21] Appl. No.: 878,837

[22] Filed: Feb. 17, 1978
(Under 37 CFR 1.47)

[51] Int. Cl.$^2$ ............................................... B32B 5/16
[52] U.S. Cl. ..................................... 428/20; 428/207; 428/208; 428/242; 428/328; 428/409
[58] Field of Search ............................ 428/206–208, 428/240, 242, 323, 328, 402, 409

[56] References Cited

U.S. PATENT DOCUMENTS

| | | | |
|---|---|---|---|
| 3,616,184 | 10/1971 | Katagiri et al. | 428/242 |
| 3,808,027 | 4/1974 | Anderson et al. | 117/47 A |

FOREIGN PATENT DOCUMENTS 1130947 10/1968 United Kingdom .

*Primary Examiner*—Bruce H. Hess

*Attorney, Agent, or Firm*—Miller & Prestia

[57] ABSTRACT

A polymeric-shaped article for use as film such as microfilm, overhead projector film, reprographic film, layout base, etc., and for insulating capacitors, which has excellent transparent, slippery and dielectric properties, and the process for realizing the same, the polymeric-shaped article having a polar surface such as polyester, polyamide, polyolefins, polyimide, polyvinyl alcohol, polyethylene terephthalate or polyethylene-2,6-naphthalate, to which is bonded a multiplicity of nodules of $TiO_2$, each nodule having a diameter in the range of from about 0.01 to about 10 µm, a height or thickness in the range of from about 0.01 to about 0.5 µm, and an area ratio of $TiO_2$ to total surface of from about 0.01 to about 50%; and the process being that of exposing at least one side of the surface of the article to water vapor and bringing a tetrafunctional titanium compound such as $TiCl_4$, tetraethyltitanate, tetraisopropyltitanate, tetra-n-butyltitanate or mixture thereof, into contact with the surface, the processing temperature being at least greater than 30° C.

11 Claims, No Drawings

POLYMERIC-SHAPED ARTICLE

BRIEF SUMMARY OF THE INVENTION

The present invention relates to a polymeric-shaped article having many nodules of $TiO_2$ in the shape of isolated spots bonded to at least one side of the surface of a polymeric material by means of exposing said surface to water vapor. The $TiO_2$ nodules are formed by adding a tetrafunctional titanium compound to the surface of the polymeric article either simultaneously with or after exposure of the surface area to water vapor.

In polymeric articles, especially in films, sheets and fibers, slippery and transparent properties are essential. However, conventional methods for improving these properties have heretofore been both difficult and unsatisfactory. Although it has been possible in the past to improve the slip of a polymeric article, the improvements have been generally accompanied by an increase in haziness. For example, U.S. Pat. No. 2,819,173 discloses means for obtaining a silky gloss by adding to the surface of a polymer 0.05~10% by weight $TiO_2$ having a particle size smaller than 150 $\mu$m, and British Patent No. 1,130,947 discloses that a slippery and thick film for use as slot liners is obtained by the addition of 1~15% by weight of an inert filler such as $TiO_2$. British Patent No. 1,096,064 discloses means for improving the surface properties of a material such as slipperiness and opacity by coating or laminating one article containing a filler to the base article. However, these filler particles as disclosed above are generally of clay mineral containing some impurities which limit the productivity of polymerization or cause a color change in the polymer, and contain grains large enough to cause an abnormal increase in pressure during the filtering of the molten polymer. As a result, classification or graining is required to remove the large particles. Such a procedure, if it is to be environmentally safe, is both expensive and time-consuming. Additionally, the film disclosed in British Patent No. 1,096,064 is difficult to recycle as a raw material for reuse.

Therefore, it is an object of the present invention to provide a polymeric article which is both slippery and transparent.

Another object of the present invention is to provide a process for carrying out this invention in which good slipperiness is obtained independent of any charge in haze or transparency.

A further object of the present invention is to provide a polymer-shaped article having excellent water-removal properties necessary in some processes for film conversion.

A still further object of the present invention is to provide a film which is suitable as a base film for microfilm, reprographic film, graphic art film and for stationary use, which may be recycled as a raw material for reuse in film making and which has good dielectrical strength and therefore may be used as an insulator in capacitors.

These and other objects of the present invention will become more apparent from the following detailed description.

DETAILED DESCRIPTION OF THE INVENTION

The tetrafunctional titanium compounds employed in the present invention are used in the form of vapor mixed with dry air or nitrogen and include, but are not limited to, titanium tetrachloride, tetraethyltitanate, tetraisopropyltitanate, tetra-n-butyltitanate and mixtures thereof. The tetrafunctional titanium compounds are contained in the gaseous vapor from about 0.1 to about 5% by volume, but more preferably from about 0.3 to about 3% by volume, in order to maintain uniform quality and ease of processing the products. When the tetrafunctional titanium compound has a high boiling point, high temperature or low pressure must be applied taking care not to damage the polymeric article.

By the use of an electron probe X-ray microanalyzer, it can be seen that the area surrounding the $TiO_2$ nodules after application of the titanium compound to the surface of the article is substantially free of titanium.

The size of the small, isolated nodules of $TiO_2$ can be observed through a microscope or a scanning electron microscope and it can be seen that the size of the $TiO_2$ nodules vary, but this variation in size can be controlled as will be explained hereinbelow.

The diameter of the $TiO_2$ nodules is shown to be generally in the range of from about 0.01 to about 10 $\mu$m, and preferably from about 0.03 to about 4 $\mu$m, and further favorably from about 0.05 to about 3 $\mu$m. The height or thickness of the nodules is from about 0.01 to about 0.5 $\mu$m, and preferably from about 0.02 to about 0.3 $\mu$m.

By controlling the size of the nodules of $TiO_2$ on the surface of the polymeric article so they will be within the above-mentioned ranges, it has been found that the slipperiness of the surface could be improved without any significant increase in haze or decrease in transparency.

The ratio of the total area of the isolated nodules divided by the entire surface area is generally from about 0.01 to about 50%, and favorably from about 0.05 to about 20%, and even more favorably from about 0.1 to about 10%. If the ratio is below about 0.01%, sufficient slip cannot be obtained. When the value of the ratio is beyond 50%, the original properties of the article can be seriously damaged. For example, the article may become too slippery to handle properly or may lose its original surface tension.

In the present invention, the $TiO_2$ nodules are bonded firmly to the surface of the base article without any change in surface properties as exemplified by pressing adhesive tape 10 mm in width to the nodules and then peeling the tape away from the surface of the article.

The size of the $TiO_2$ nodules depends on the amount of water vapor to which the surface of the article is exposed and to the temperature of the gaseous vapor containing the tetrafunctional titanium compound.

In the process of exposing the surface of the article to water vapor, the best effect is achieved by exposing the surface to as much of the water vapor as is possible without the water vapor forming visible water droplets which would cause the nodules of $TiO_2$ to be too large.

Generally, the processing temperature should be maintained as high as possible without damaging the polymeric article. The processing temperature should be at least more than about 30° C. and preferably at more than about 60° C. If the processing temperature is lower than about 30° C., the speed of reaction to $TiO_2$ is so slow that the proper distribution and strong bonding of $TiO_2$ to the surface does not occur. It is preferable that the temperature be controlled from about 90° to about 200° C. because within this range, many fine nodules are formed.

Coating, corona treatment, flame treatment, grafting or other processing on the surface of the article of this invention before the appearance of TiO$_2$ do not obstruct the manufacture or the effect of this invention.

Polymers for use in the article of the present invention are preferably in the form of film and include, but are not limited to, polyesters such as polyethylene terephthalate and polyethylene-2, 6-napthalate; polyamides such as nylon 6 and nylon 66; polyolefins such as polypropylene; polyimides, polyvinyl alcohol and their copolymers.

When the polymeric article of this invention is sheet or film, the article is generally made by a melt extrusion method if the material can be melted. The polymer is first dried to avoid adverse effects from the humidity and is then sent to a properly heated extruder in the form of chips or in the form of melted polymer. The extruder can be co-used with a gear pump, and sometimes only a gear pump is used.

The melted polymer is extruded through a die near the extruder and is solidified quickly on a casting drum. If necessary, it is then oriented uniaxially or biaxially, and generally heat set. If the properties of the film are sufficient without orientation, then stretching of the article is not necessary.

Biaxial orientation can be carried out in the order of machine direction and transverse direction or vice versa. In some cases, simultaneous biaxial stretching is also carried out and sometimes further drawing in one or two directions is performed after biaxial stretching.

If a polymer cannot be extruded, the polymer is dissolved by means of a suitable solvent and then cast on a large drum or endless metal belt. The film is obtained by vaporizing the solvent.

A calender method and rolling method are also known in the manufacture of film. The many small, isolated nodules of TiO$_2$ of the present invention are combined with the surface of a non-stretched or uniaxially stretched sheet or film. When the sheet or film is stretched, dots of TiO$_2$ are not drawn. Therefore, the area ratio of TiO$_2$ to total area is greatly decreased giving the article clarity and slip, with the adhesion property being retained at the original level of the film.

A method of manufacturing a rainbow pattern on a film by the gathering of light on a thin film of TiO$_2$ which is made by spraying TiCl$_4$ on a plastic film is also generally known, and polyethylene terephthalate is a known polymer for this film. Since the film in this case cannot be stretched, a film which has already been biaxially stretched and heat set is used. If drawn, the thin film of TiO$_2$ is broken and then loses the rainbow color but in any case, this film will lose its value because the color of the TiO$_2$ film changes from rainbow to opaque in one month or at longest in one year and a half under ordinary conditions.

The stretching conditions for the polymeric article with TiO$_2$ vary depending upon the polymer. For example, for polypropylene drawing is carried out from about 110° to about 170° C., with the drawing ratio being from about 5 to about 12 times in both directions. Polyethylene terephthalate is stretched from about 80° to about 130° C., and preferably from about 85° to about 120° C. The drawing ratio in the machine direction is from about 2 to about 8, and preferably from about 2.5 to about 6. The ratio in cross section is from about 2 to about 5, and preferably from about 2.5 to about 4.0. Polyethylene-2,6-naphthalate can be extruded from about 280° to about 320° C. and stretched from about 105° to about 160° C., and preferably from about 110° to about 150° C. The ratio is almost the same for polyethylene terephthalate. Polyamide such as nylon 6 is extruded from about 230° to about 260° C. and stretched from about 60° to about 150° C., and the ratio is about 6 to about 12 times. These films are generally heat set with the heat set temperatures also varying depending upon the polymer. For example, the heat-set temperature for polypropylene film is from about 155° to about 170° C.; for polyethylene terephthalate or polyethylene-2,6-naphthalate from about 150° to about 240° C., and preferably from about 180° to about 235° C.; and for polyamide from about 150° to about 210° C. The effect of heat setting not only stabilizes the dimensions of the film but also accelerates the reaction of the non-reacted substance from a tetrafunctional titanium compound.

As discussed previously, attempts to make a slippery film by addition of additives into the polymer have resulted in relatively hazy film. In the case of polyethylene terephthalate, biaxial stretching generally causes a planar refractive index larger than 1.57 and refractive index in directional thickness smaller than 1.57, and consequently, voids are created around the fillers, causing haziness in the film. With respect to the polymeric article of the present invention, the nodules or spots of TiO$_2$ are independently bonded to the surface in the shape of a circle or ellipse, the size of which is from about 0.01 to about 10 $\mu$m, resulting in a polymeric article having good slip, transparency and water-removal properties, and which can be easily handled and/or converted.

The present invention is further illustrated by the following specific examples. In this connection, haze was measured by the ASTM D-1003 test; the coefficient of static friction was measured by the ASTM D-1894 test; and the heights of nodules or spots of TiO$_2$ were measured by metallizing the film surface at a known low angle, thereby replicating the surface and viewing the replica by means of an electron microscope.

EXAMPLE 1

An amorphous polyethylene terephthalate film having a thickness of 1.000 $\mu$m and an intrinsic viscosity of 0.602 measured in o-chlorophenol at 25° C., was exposed to moist air at 45° C. for 0.5 seconds and thereafter to an atmosphere of dry air containing 0.41% by volume of TiCl$_4$ and maintained at 50° C. for 0.3 seconds.

The treated amorphous film was subjected successively to a longitudinal directional stretch followed by a transverse directional stretch. The film was stretched to 3.3 times its original length in the longitudinal direction at 90° C. and to 3.4 times its original width in the transverse direction at 95° C., and heat set at 220° C. The film of the present invention had a multiplicity of isolated nodules of TiO$_2$ having a diameter of about 0.5 $\mu$m and a thickness of about 0.1 $\mu$m on the surface of both sides of the film. The area surrounding each nodules was substantially free of titanic material and the total ratio of the area of the nodules of TiO$_2$ to the area of film surface was about 0.8%. Additional results are summarized in Table 1 below.

Table 1

| Reference | Example 1 | Control |
|---|---|---|
| Coefficient of Static Friction | 0.4 | >2 |
| Haze (%) | 1.3 | 0.3 |

Table 1-continued

| Reference | Example 1 | Control |
|---|---|---|
| Light Transmission (%) | 86.0 | 88.0 |

The properties of the film of the present invention after being maintained at room temperature and humidity for two years were equal to the original properties and the water-removal properties were excellent.

EXAMPLE 2

The general procedure of Example 1 was repeated; however, this time the film and air containing $TiCl_4$ at 150° C. were exposed to a moist atmosphere maintained at 130° C. There was no exposure to moist air at 45° C. The properties of the film are summarized in the following Table 2.

Table 2

| Diameter of $TiO_2$ nodules ($\mu$m) | 0.7 |
|---|---|
| Thickness of $TiO_2$ nodules ($\mu$m) | 0.05 |
| Total Ratio of the area of $TiO_2$ to the Area of film surface (%) | 1.2 |
| Coefficient of Static Friction | 0.63 |
| Haze (%) | 1.1 |

Transparency of this film was excellent and the film was suitable for use as an overhead projector film.

EXAMPLE 3

The general treatment was repeated as in Example 1 except that dry air containing saturated vapor pressure of tetraisopropyl titanate at 103° C. or saturated vapor pressure of tetra-n-butyltitanate at 130° C. was used in place of the air containing $TiCl_4$.

Only one surface of each film was treated. After processing, the treated surface had many small isolated nodules of $TiO_2$ having a diameter of about 0.2 $\mu$m and a height of about 0.075 $\mu$m. The treated surface showed surface and optical characteristics similar to those obtained in Examples 1 and 2. The area ratio of $TiO_2$ to total area of the surface was about 0.9%.

EXAMPLE 4

The general procedure of Example 2 was repeated except that polyethylene-2,6-naphthalate was used as a base film instead of polytheylene terephthalate with the film after treatment being subsequently stretched to 3.2 times its original length in the longitudinal direction at 130° C.; 3.5 times its original width in the transverse direction at 135° C., and heat set at 225° C. The properties of the film are summarized in Table 3.

Table 3

| Thickness of film($\mu$m) | 16 |
|---|---|
| Diameter of $TiO_2$ nodules ($\mu$m) | 0.8 |
| Height of $TiO_2$ nodules ($\mu$m) | 0.06 |
| Total Ratio of the area of $TiO_2$ to the area of film surface (%) | 1.1 |
| Coefficient of Static Friction | 0.53 |
| Haze (%) | 0.20 |

This film was found to have excellent optical and slip properties.

EXAMPLE 5

An amorphous nylon 6 yarn was exposed to dry air containing moisture vapor and 1% by volume of tetraisopropyltitanate at 115° C. for 1.3 seconds, then stretched to about 5.2 times its original length. The yarn, having a size of 105 D, was found to have many small isolated nodules of $TiO_2$ on the surface, and exhibited good slip.

EXAMPLE 6

The general procedure of Example 1 was repeated, except that polypropylene having a thickness of 180 $\mu$m was used as a base film instead of polyethylene terephthalate and after treatment, the film was stretched to 5.0 times its original length in the longitudinal direction at 125° C.; 8.0 times its original width in the transverse direction at 160° C., and heat set at 160° C. The film was found to have many isolated nodules of $TiO_2$ on its surface. Additional results are summarized in the following Table 4.

Table 4

| | Example 6 | Control |
|---|---|---|
| Diameter of $TiO_2$ nodules ($\mu$m) | 0.8 | — |
| Height of $TiO_2$ nodules ($\mu$m) | 0.12 | — |
| Coefficient of Static Friction | 0.45 | >1.0 |
| Haze (%) | 3.0 | 2.9 |

EXAMPLE 7

An amorphous polyethylene terephthalate film having a thickness of 87 $\mu$m was exposed to air containing moisture vapor and 0.32% by volume $TiCl_4$ at 170° C. for 0.4 seconds, and after treatment, the film was stretched to 3.9 times its original length in the longitudinal direction; 3.7 times its original width in the transverse direction at 88° C., and heat set at 225° C. The results are summarized in the following Table 5.

Table 5

| Diameter of $TiO_2$ nodules ($\mu$m) | 0.6 |
|---|---|
| Height of $TiO_2$ nodules ($\mu$m) | 0.15 |
| Coefficient of Static Friction | 0.65 |
| Haze (%) | 0.9 |

The film was found to have a dielectric strength 1.1 times as great as "Lumirror" C10 (polyethylene terephthalate) having the same thickness.

We claim:
1. A polymeric shaped article comprising means for increasing the slip characteristics of said article without causing any significant increase in the haze of said article, said means comprising a plurality of small isolated nodules or spots of $TiO_2$ which are bonded to a surface of said article, said nodules or spots being independently bonded to said surface, and having the form of a circle or an ellipse, the diameters of said $TiO_2$ nodules or spots being on the order of from about 0.01 to about 10 $\mu$m when microscopically observed in a flat condition, the thickness of each said nodule or spot being from about 0.01 to about 0.5 $\mu$m, and the area ratio of said nodules or spots to the total surface area being about 0.01 to about 50%.

2. A polymeric shaped article according to claim 1 wherein the diameters of the $TiO_2$ nodules or spots are from about 0.03 to about 4 $\mu$m.

3. A polymeric shaped article according to claim 1 wherein the diameters of the $TiO_2$ nodules or spots are from about 0.05 to about 3 $\mu$m.

4. A polymeric shaped article according to claim 1 wherein the thicknesses of the $TiO_2$ nodules or spots are from about 0.02 to about 0.3 $\mu$m.

5. A polymeric shaped article according to claim 1 wherein the area ratio of TiO$_2$ is from about 0.05 to about 20% of the total surface area.

6. A polymeric shaped article according to claim 1 wherein the area ratio of TiO$_2$ is from about 0.1 to about 10% of the total surface area.

7. A polymeric shaped article according to claim 1 wherein the article is in the form of film, sheet or fabric.

8. A polymeric shaped article according to claim 1 wherein the article is oriented in at least one direction.

9. A polymeric shaped article according to claim 1 wherein the article is in the form of biaxially-oriented film.

10. A polymeric-shaped article according to claim 1 wherein the polymer is selected from the group consisting of polyester, polyamide, polyolefin, polyimide and polyvinyl alcohol.

11. A polymeric shaped article according to claim 1 wherein the polymer is a polyester selected from the group consisting of polyethylene terephthalate and polyethylene-2,6-naphthalate.

* * * * *